United States Patent [19]

Strauch, Jr.

[11] 4,350,944
[45] Sep. 21, 1982

[54] VARIABLE CONTROL CIRCUIT HAVING A TIMED BYPASS

[75] Inventor: George E. Strauch, Jr., San Antonio, Tex.

[73] Assignee: Power Controls Corporation, San Antonio, Tex.

[21] Appl. No.: 200,377

[22] Filed: Oct. 24, 1980

[51] Int. Cl.³ .............................................. H02P 5/40
[52] U.S. Cl. ................... 318/779; 318/806; 318/812; 318/475; 98/121 A
[58] Field of Search ............. 318/779, 806, 812, 335, 318/475, 476; 338/200; 98/121 A

[56] References Cited

U.S. PATENT DOCUMENTS

| | | | |
|---|---|---|---|
| 3,389,315 | 6/1968 | Andreas et al. | 318/779 |
| 3,541,412 | 11/1970 | Worth | 318/812 |
| 3,949,347 | 4/1976 | Gilbreath | 338/200 |
| 3,990,033 | 11/1976 | Wall | 338/200 |
| 4,085,399 | 4/1978 | Wall | 338/200 |
| 4,117,445 | 9/1978 | Foreman et al. | 338/200 |

Primary Examiner—B. Dobeck
Attorney, Agent, or Firm—Gunn, Lee & Jackson

[57] ABSTRACT

A switch, that appears the same as an ordinary snap switch, is shown with a positive ON and a positive OFF with a variable control circuit therebetween. The variable control circuit includes a triac gated through a diac to give an infinite control range that depends upon the point at which the triac is triggered. In using the variable control circuit of the switch, a shunt or a bypass is provided for the gate of the triac through a full wave bridge rectifier circuit for a predetermined time interval. The time interval is determined by an RC time constant connected across the bridge. Therefore, for the aforementioned predetermined time interval, essentially a full wave AC voltage is passed through the triac to a load. For motors, this allows the motor to come up to speed prior to subsequently reducing the speed of the motor by the variable control circuit after the predetermined time interval.

5 Claims, 4 Drawing Figures

VARIABLE CONTROL CIRCUIT HAVING A TIMED BYPASS

BACKGROUND OF THE INVENTION

This invention relates to a switch that appears the same as an ordinary snap switch but has a variable control circuit located between the extreme positions of the switch and, more particularly, to a variable control circuit having a positive ON and positive OFF with a variable control therebetween, plus a timed bypass for the variable control circuit allowing the maximum voltage to be delivered to the load for a predetermined time interval.

BRIEF DESCRIPTION OF THE PRIOR ART

Prior to the present invention, variable control switches, such as light dimmers that appear the same as an ordinary snap switch, have been in existence for some time. The assignee of the present invention is the owner of U.S. Pat. No. 3,990,033 and U.S. Pat. No. 4,085,399, both of which show the control circuitry in FIGS. 7 and 10, respectively. In both of these patents, the device appears the same as an ordinary snap switch. When the lever is in the extreme position (which may be only up or down), no current is flowing through the switch to the load; however, when the lever is in the other extreme position, a control circuitry is bypassed with the entire voltage being delivered to the load. When the switch is in an intermediate position, an infinitely variable control circuit delivers the desired amount of power delivered to the load. If the switch is changed from the OFF position to an intermediate position, only a small amount of the line voltage will be delivered to the load. For inductive loads, such as motors, there may not be enough power to start the motor turning when the switch is in the intermediate position. In cases of the switch being used to operate motors for attic fans with mechanical louvers, there may not be enough initial velocity in the fan to open the louvers.

Applicant is also the owner of U.S. patent application Ser. No. 797,528 filed on May 16, 1977, for a "Three-way Light Dimmer Switch" that can be dimmed from either switch location. Again, a positive ON and positive OFF feature is provided with the control circuitry being shown in FIG. 2.

Applicant is also the owner of U.S. patent application Ser. No. 166,057 filed on July 7, 1980, entitled "Light Dimmer Switch Having Remote Load Current Switching" with the control circuitry being shown schematically in FIG. 1. Again in this patent application by applicant, a positive ON and positive OFF feature is provided with an infinitely variable control circuit therebetween. All of the patents and patent applications discussed hereinabove, owned by applicant, were designed primarily for use in dimming incandescent lights. It was not envisioned that a highly inductive load, such as a motor, would be attached to the switches. In fact, instructions on containers for the switches advised against the use of the switches for inductive loads.

SUMMARY OF THE INVENTION

It is the object of the present invention to provide a variable control switch having a timed bypass with a positive ON and positive OFF.

It is another object of the present invention to provide a variable control circuit for inductive loads having a timed bypass so that when the variable control circuit is connected to a load, the gate for the switching circuit will be shunted for a predetermined period of time so that the maximum power can be delivered to the load.

It is still another object of the present invention to provide a full wave bridge rectifier circuit having an RC time constant connnected thereacross which acts as a shunt to bypass a normal phase control circuit for the gate portion of a switching device.

A device as provided appears to be the same as an ordinary toggle actuated snap switch, which device has a full ON and a full OFF position depending upon the toggle being at one of the two extreme positions. If the toggle, also called actuator arm, is located between the two of extreme positions, a control circuit connects the AC voltage to the load through a switching device such as a triac. The gate circuit of the triac contains a phase control portion with a series resistor and capacitor connected across the source of power, and with a diac located in the gate lead line connected therebetween.

When the lever in the switch is moved from the OFF position, but not to the full ON position, the control circuitry as located in one lead of the AC source is connected to the load. The control circuitry is initially shunted by the flow of current through the bridge circuit and the capacitor the gate of the triac. Flow of current through the capacitor gates the triac ON and OFF thereby allowing essentially the full voltage from the AC source to flow therethrough to the load. After a predetermined period of time, controlled by the capacity of the capacitor and a resistor parallel with the capacitor, the capacitor will become charged thereby preventing further current flow through the bridge network and cutting OFF the shunt or bypass provided by the bridge network. Thereafter, the gating for the triac will be controlled by the other RC time constant connected to the diac in the gate lead, which diac connects to the gate of the triac. The RC time constant is controlled by a variable resistor that operates in response to movement of the lever. A portion of the resistor is fixed with another portion of the resistor being variable.

Another series resistor and capacitor is connected across the load lines to prevent in-rush current and unwanted noise spikes that occur during switching.

By the use of the timed bypass, the same circuit can be used for both gating and timing. The resistor or capacitor in the bypass can be varied for timing purposes. The charging time for the bypass can be varied according to the load with no separate power supply being required.

DESCRIPTION OF THE PREFERRED EMBODIMENT

Figure 1:
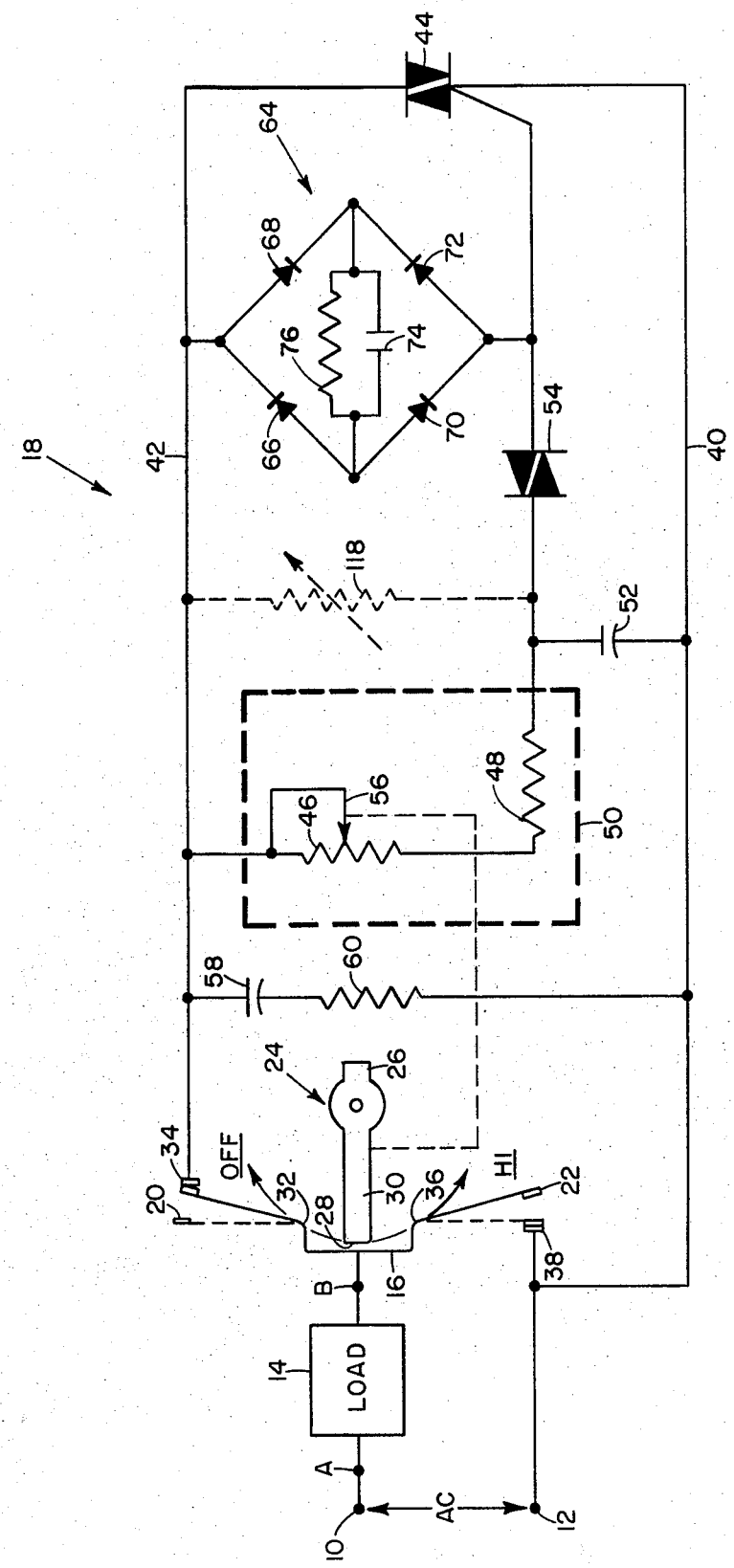
FIG. 1 is a circuit schematic showing a variable control circuit having a positive ON and a positive OFF with a timed bypass.

Referring now to FIG. 1, there is shown an electrical schematic of the present invention which is designed to fit in a housing similar to an ordinary snap switch commonly used in homes; however, provide full range control and especially designed for use with inductive loads. An AC voltage is connected across input terminals 10 and 12. Input terminal 10 connects to a load 14 prior to connecting to the armature 16 of the switch represented generally by a reference numeral 18. Armature 16 has contacts 20 and 22 on either end thereof.

Lever 24 operates in conjunction with armature 16 to control current flow through the load 14. When the external porportion 26 of the lever 24 is down in its lowermost position, end 28 of the internal portion 30 comes into an abutting contact with the shoulder 32 of the armature 16 to disconnect contact 20 from contact 34 as shown in dotted lines, which will be explained in more detail subsequently. Conversely, when external portion 26 of lever 24 is in the uppermost position, end 28 of internal portion 34 comes into an abutting contact with shoulder 36 an electrical connection between contact 22 of armature 16 and contact 38 is made as indicated in dotted lines, which will also be explained in more detail subsequently.

For intermediate positions of the lever 24 as shown in FIG. 1, the AC voltage connected across input terminals 10 and 12 feeds through the circuitry portion of switch 18, contacts 20 and 34, armature 16, and load 14. The circuitry portion of switch 18 controls the amount of voltage being delivered to load 14. As can be seen in FIG. 1, base voltage line 40 is always connected to the AC source. The control voltage line 42 is connected to load 14, except when lever 24 is in the OFF position with the external portion 26 in its lowermost position. Also, when lever 24 is in the high position with the external portion 26 being in its uppermost position, the entire circuitry of switch 18 is shunted through the armature 16 and contacts 22 and 38.

Referring now to the operation of the circuit as shown in switch 18, many times it is desirable to vary the voltage being delivered to a load. The normal method of varying such a voltage being delivered to a load would be through a switching device such as triac 44. Triac 44 is a standard device that may be purchased commercially. In a normal gating arrangement for the triac 44, a resistor (such as variable resistor 46 and fixed resistor 48 of pot strip 50) is used in series connection with gating capacitor 52 to trigger a diac 54, which in turn operates the gate of triac 44. The physical movement of the lever 24 internally operates the wiper arm 56 of variable resistor 46. The fixed resistor 48 sets the minimum voltage operation point of the diac 54 with variable resistor 46 providing the range of control.

Connected between the base voltage line 40 and the control voltage line 42 is a filter capacitor 58 connected in series with a current limiting resistor 60. This series connection is necessary because of the inductance of the load 14 to give RFI filtering and to eliminate RFI variations from the line voltage. The current limiting resistor 60, which is sometimes called a "snubber," is used to prevent inductive spikes that could possibly blow the triac 44. Also, the series connection of filter capacitor 58 and current limiting resistor 60 prevent "in-rush" current and provide dampening. The circuit of switch 18, without more as will be subsequently described, will provide a wave form 62 as shown in voltage FIG. 4, which voltage wave form 62 is developed across the triac 44. The portion represented by broken lines is when the triac 44 is conducting and is delivered to the load 14. The point of triggering on the wave form 62 is controlled by the RC time constant of variable resistor 46, fixed resistor 48, and capacitor 52. This RC time constant actuates the diac 54 which gates the triac 44.

However, shunting or bypassing the gate control circuit formed by pot strip 50, gating capacity 52 and diac 54 is a bridge circuit generally referred to with reference numeral 64. The bridge circuit 64 is made up of diodes 66, 68, 70 and 72 to form a diode bridge. The upper portion of the bridge is connected to control voltage line 42 and the lower portion of the bridge connects between diac 54 and the gate of triac 44. Connected across the bridge 64 in a parallel arrangement is a bypass capacitor 74 and a bleeder resistor 76. Assuming that lever 24 had been in the OFF position and then moved into an intermediate position as shown in FIG. 1, current will bypass or shunt the normal gate circuitry formed in conjunction with diac 54. Instead the current will initially flow through the bridge circuit 64 and bypass capacitor 74 to the gate of triac 44. By the use of the bridge circuit 64, as shown in FIG. 1, the triac 44 will pass essentially the entire sign wave form 78 shown in FIG. 4 to the load 14 until the bypass capacitor 74 is charged. The charge time of bypass capacitor 74 depends upon the RC time constant formed with capacitor 74 and bleeder resistor 76. It is expected that if the load 14 is a fan normally used in a home, the bypass through the bridge circuit 64 would normally be about 10 seconds. In testing, the shunting or bypass as provided by gate circuit 64 has been varied between 1 to 20 seconds.

Figure 4:
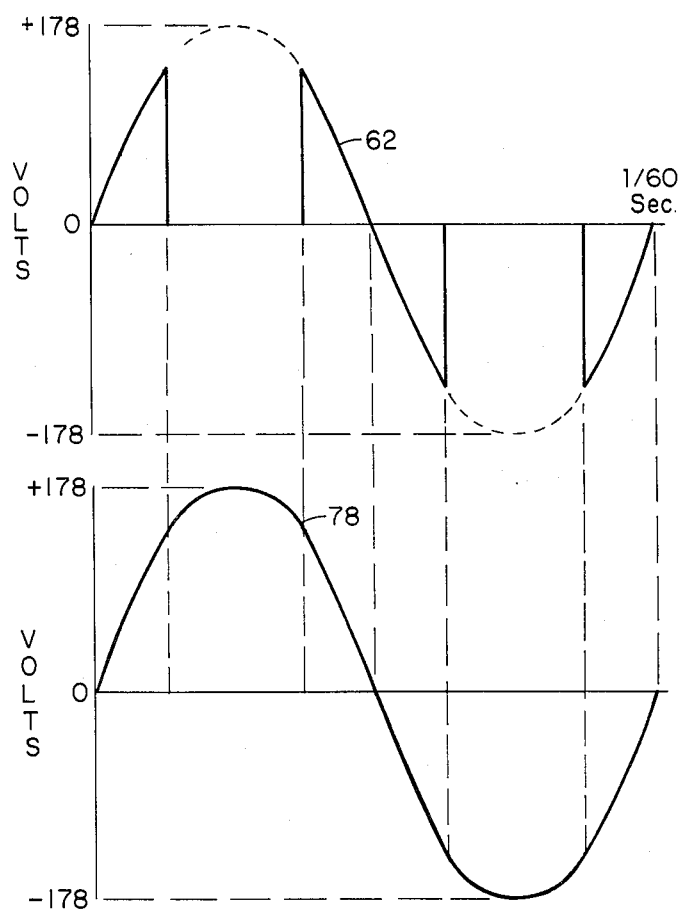
FIG. 4 shows typical voltage waveforms delivered to the load initially and after a predetermined time delay when the lever is moved to an intermediate position.

After the bypass or shunting provided by bridge circuit 64 has expired by the charging of capacitor 74, which gives the wave form 78 being delivered to the load 14 as shown in FIG. 4, the wave form will resume its normal switching wave form 62 being delivered to the load 14 if the lever 24 is in the intermediate position. When the lever 24 is in the high position with the external portion being in its uppermost location, the entire circuitry of the switch 18 is bypassed or shunted through the armature 16 and contacts 22 and 38 so that the wave form 78 as shown in FIG. 4 is delivered directly to the load 14.

Figure 2:
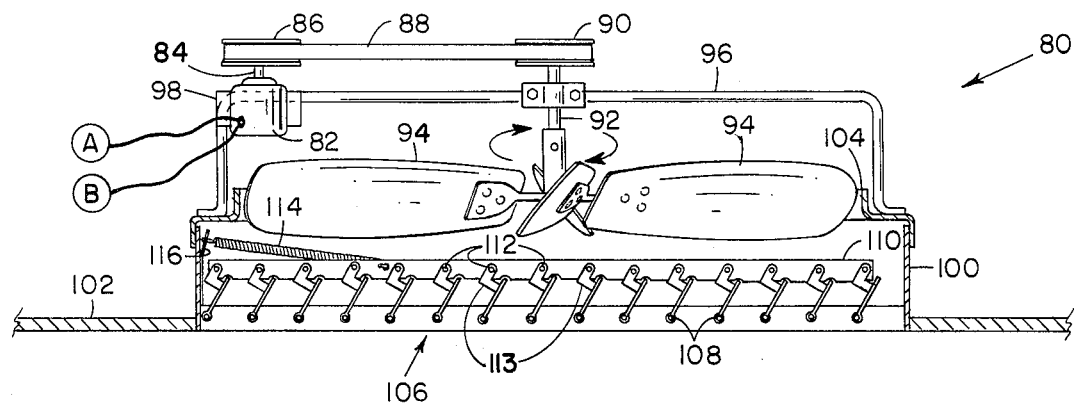
FIG. 2 shows a typical load that may be operated by the circuit shown in FIG. 1 wherein full voltage may initially be necessary to bring a fan up to a predetermined speed to open a spring-loaded, mechanically-hinged louver before slowing down to a lesser speed as regulated by the circuit of FIG. 1.
Figure 3:
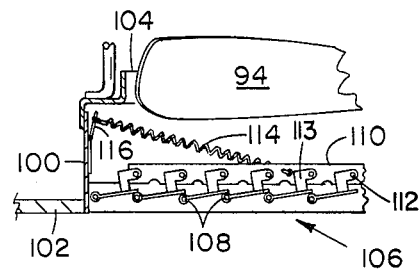
FIG. 3 is another view of FIG. 2 without the fan operating and the louvers closed.

Referring now to FIGS. 2 and 3 in combination, a typical environment where the timed bypass variable control switch with a positive ON and positive OFF position may be utilized is shown. For typical household attic fan 80 as shown in FIGS. 2 and 3, the motor 82 is essentially the load 14 as shown in FIG. 1, and is connected between terminals A and B. Connected to the shaft 84 for the motor 82 is a pulley 86. The pulley 86 is connected by means of a belt 88 to pulley 90, which connects by means of shaft 92 to fan blades 94. Internally within mounting rods 96 is located a bearing housing (not shown) through which shaft 92 extends. The motor 82 may be mounted by any suitable means such as mounting plate 98 that is welded to mounting rods 96.

The household attic fan 80 normally has a rectangular mounting box 100 that physically connects to the ceiling 102 of one of the rooms of the house. Physically connected to the uppermost portion of the rectangular mounting box 100 is a shroud 104 that receives the fan blades 94 in a close contiguous relationship therewith. The extreme ends of mounting rods 96, which normally form an "X" across shroud 104, are connected to the outermost portion of shroud 104 by any convenient means such as bolts or welding. Mounted in the lowermost portion of the rectangular mounting box 100 are louvers indicated generally by reference numeral 106. In FIG. 2, the louvers are in their open position and the fan blades 94 are turning. Each of the louvers is pivotally connected at its lowermost portion by pins 108 to the front and rear walls of the rectangular mounting box 100. The uppermost portion of the louvers 106 are pivotally connected to a cross beam 110 near the center thereof by means of pins 112. A spring 114 is connected between the cross beam 110 and mounting strip 116 that connects to the rectangular mounting box 110. The spring 114 does not have sufficient strength by itself to hold the louvers 106 in the open position. To start the louvers opening requires significantly more force than it does to hold the louvers open due to the pivot points. In other words it would require a significant amount of force to open the louvers shown in FIG. 3, but considerably less force to hold the louvers 106 open as shown in FIG. 2, which is accomplished by the force of spring 114 and the airflow created by the fan blades 94.

By use of the switch 18 as shown in FIG. 1, if the load is the motor 82 of FIG. 2, once the lever 24 is moved from the OFF position to an intermediate position, the bypass formed by the bridge circuit 64 will allow the full voltage to flow through the triac 44 to the motor 82. Therefore, the motor 82 will come up to speed during the few seconds of bypass provided by the bridge circuit 64 for the triac 44, which motor 82 turns the fan blades 94 creating suction against the louvers 106. During this time interval, the suction created by the fan blades 94, which are increasing toward their maximum velocity in combination with spring 114, will open louvers 106. Thereafter, the capacitor 74 of the bridge circuit 64 becomes charged and only a portion of the voltage is delivered through triac 44 to the motor 82. This causes the speed of the fans 94 to decrease; however, they are still continuing at enough velocity to keep the louvers 106 in the open position when aided by the spring 114. Subsequently, if the switch 18 is turned OFF, the operation of lever 24, capacitor 74 would discharge in a matter of seconds through bleeder resistor 76 thereby allowing the next operation of the switch 18 to again apply maximum voltage to the load through the timed bypass formed by the bridge circuit 64.

The invention just described is also very useful for inductive loads that have a high starting torque. For many motors, maximum voltage must be applied to start the motor turning, but after the motor begins picking up speed, the amount of voltage applied to the motor does not have to be as great. Therefore, with motors or inductive loads having high starting torque but over which a person desires to control the operating speed, the switch as shown in FIG. 1 is very useful.

Referring back to FIG. 1, there is shown a variable resistor 118 in broken lines. Variable resistor 118 is in parallel with pot strip 50 and variable resistor 46 and fixed resistor 48 located thereon. By use of the variable resistor 118, it would be possible to vary the set point for different inductive loads. For example, most household attic fans would require a minimum rms voltage of 70 to 85 volts with the range over which the voltage wave form could be regulated, being from the minimum rms volts to the maximum of the 120 rms voltage. The use of the variable resistor 118 simply adds precision to the set points for the gating of triac 44 by disc 54 as required for different loads. In the control circuit of switch 18 in the simplest form, the precision added by variable resistor 118 is not required, but is desirable.

By use of the switch 18, as shown in FIG. 1, if the power went OFF for a few seconds (long enough for capacitor 74 to discharge), once power was restored, the grating circuit of triac 44 would be bypassed by the bridge circuit 64 to apply maximum power to the load 14 for the predetermined time interval. In the typical usage previously described for a household attic fan, this would be sufficient time again for the louvers 106 to open, and thereafter remain open even for lower speed of operation of the fan blades 94.

What is claimed is:

1. A variable speed control system for fans having spring loaded mechanical louvers comprising:
   AC voltage source;
   fan blades mounted adjacent to said spring loaded mechanical louvers;
   a spring connected to said mechanical louvers for urging said mechanical louver to an open position but having insufficient strength to hold said mechanical louvers in an open position;
   AC motor connected to said fan blades for turning said fan blades upon turning said motor by said AC voltage source;
   control circuit located between a first side of said AC voltage source and said AC motor, a second side of said AC voltage source being connected to said AC motor, said control circuit further comprising:
   single armature means actuated by an uppermost and a lowermost movement of a toggle lever for a positive ON and a positive OFF, respectively, through contacts on said single armature means;
   switching means connected between one of said contacts of said single armature and said AC voltage source, said switch means having a gate;
   first variable resistance means and first capacitor means in series across said switching means and having gating means connected therebetween to said gate;
   bridge means connected between one side of said switching means to said gate to shunt said gating means for a predetermined time interval, said bridge means having an RC network thereacross to set said predetermined time interval of sufficient duration to bring said fan blades to near full speed to open said louvers before slowing said AC motor for intermediate positions of said toggle lever by eliminating said shunt.

2. The variable speed control system as given in claim 1 wherein said first variable resistance means is a single potstrip having a first resistor and a first variable resistor, said fixed resistor setting a minimum voltage for operating said AC motor.

3. The variable speed control system as given in claim 1 wherein said RC network is a resistor in parallel with a second capacitor, one of which is variable to set said predetermined time interval.

4. The variable speed system as given in claims 2 or 3 including a second variable resistor in parallel with said first variable resistor to change said minimum voltage.

5. The variable speed system as given in claim 4 wherein said bridge means is a diode bridge, said gating means is a diac and said switching means is a triac.

* * * * *